United States Patent [19]

Hundleby

[11] Patent Number: 5,065,712

[45] Date of Patent: Nov. 19, 1991

[54] INTERNAL COMBUSTION ENGINES

[75] Inventor: Giles E. Hundleby, Horsham, England

[73] Assignee: Ricardo Group PLC, Shoreham-by-Sea, England

[21] Appl. No.: 622,541

[22] Filed: Dec. 5, 1990

[51] Int. Cl.$^5$ ............................................. F01L 3/00
[52] U.S. Cl. .............................. 123/188 M; 123/432; 123/308
[58] Field of Search ................. 123/188 M, 432, 308

[56] References Cited

U.S. PATENT DOCUMENTS 4,805,569 2/1989 Suzumura et al. ............. 123/188 M

FOREIGN PATENT DOCUMENTS 1568302 5/1980 United Kingdom .

*Primary Examiner*—E. Rollins Cross
*Assistant Examiner*—Erick Solis
*Attorney, Agent, or Firm*—McAulay, Fisher, Nissen, Goldberg & Kiel

[57] ABSTRACT

A two-stroke engine includes at least one cylinder, a piston reciprocable within the cylinder and a cylinder head which contains at least one exhaust port and at least two inlet ports which are controlled by respective poppet valves. The cylinder defines a combustion chamber of pent-roof form with which the inlet and exhaust ports communicate. The inlet ports are of directed type whereby, in use, the flow of air through them is generally away from the exhaust valve(s) and thus flows down the wall of the cylinder adjacent the inlet port. The axes of the inlet ducts converge in the direction of flow through them and the axis of each inlet defines angle of at least 20° with that of the other inlet duct when viewed in the direction of the cylinder axis.

7 Claims, 2 Drawing Sheets

INTERNAL COMBUSTION ENGINES

The present invention relates to internal combustion engines and is concerned with such engines of four stroke or more particularly of two stroke type which include at least one cylinder, a piston reciprocable within the cylinder and a cylinder head which contains at least one exhaust port which is controlled by a poppet valve and at least two inlet ports which are controlled by respective poppet valves and are connected to respective inlet ducts, the cylinder and cylinder head defining a combustion chamber, e.g. of pent-roof form, with which the inlet and exhaust ports communicate, the inlet ports being of directed type whereby, in use, the flow of air through the inlet ports is generally away from the exhaust valve(s) and thus flows down the wall of the cylinder adjacent the inlet ports. Directed ports are that type of port in which the air flowing through it into the cylinder flows preferentially in one radial direction relative to the associated valve axis. Such ports communicate with an inlet duct which has a relatively abrupt bend shortly upstream of the port. The radius of the inside of the bend is typically less than 0.3 r where r is the radius of the port, and is substantially less than the radius of the outside of the bend whereby, in use, the air flow breaks away from the inside of the bend and enters the cylinder preferentially in the direction determined by the inlet duct upstream of the bend, i.e. the direction is substantially unaffected by the bend. The air thus enters the cylinder predominantly on one side of the port with respect to the valve axis.

It is known that in spark ignited four stroke engines a high degree of turbulence in the inlet charge of fuel and air promotes rapid and complete combustion. It is known to produce such turbulence by the provision of so-called "squish" areas in which part of the upper surface of the piston closely approaches a corresponding part of the cylinder head during its approach to the top dead centre (TDC) position of the piston thereby squeezing air out of this area into the combustion chamber and producing intense turbulence of the air and fuel at the TDC position. It is also known to generate swirl in the inlet charge as it enters the cylinder which is largely converted into turbulence as the piston approaches the TDC position.

An alternative method of generating turbulence around TDC is to induce "tumbling" motion of the air in the cylinder by constructing the inlet port(s) so that they produce rotation of the air in the cylinder about an axis which is transverse to the axis of the cylinder. Unlike swirl, which tends to continue in the cylinder beyond TDC, tumbling motion is wholly converted into turbulence at TDC. "Tumbling" motion is effective not only for producing turbulence in two stroke and four stroke engines but also for effectively purging two stroke engines. Known engines of this type include inlet ducts which are substantially parallel to the cylinder axis whereby air flowing in through the inlet ports flows predominantly down the adjacent side of the cylinder and is then caused to flow across the piston and up the other side of the cylinder, thereby creating a degree of tumbling motion.

In recent years there has been considerable interest in the use of the two stroke cycle in vehicle engines so that a smaller and lighter engine may be obtained. Engines with piston controlled inlet ports are particularly attractive in this respect but they are nevertheless not favoured for use in vehicle engines because the presence of the ports and the consequent asymmetrical thermal loading results in the cylinder being subject to excessive distortion which leads to problems of sealing and of friction and thus wear.

Distortion of the cylinder can be avoided in two stroke engines by providing them with poppet valves of conventional type in the cylinder head. An engine of this type and of the type referred to in the precharacterising portion of claim 1 is disclosed in GB-A-1568302. This engine includes two inlet valves which are inclined to the exhaust valve(s) by such a large angle that the angle of the resulting pent-roof construction of the combustion chamber is such that it is impossible to achieve a high compression ratio with a concave or flat topped piston which is the preferred construction for various reasons including the fact that a piston with a substantially domed or projecting crown would interfere with the required tumbling motion. The inlet ports are separated from the exhaust port(s) by a wall or baffle with which the inner edges of the inlet valves remain in contact over substantially all of their travel whereby the air flows past the inlet valves substantially only on the side remote from the baffle and is then guided by the adjacent cylinder wall into the tumbling configuration. If the angle between the inlet and exhaust valves were reduced so as to enable the reduction of the volume of the combustion chamber then the outflow of air from the directed inlet ports would be significantly impeded by the proximity of the adjacent cylinder wall which would reduce the flow of air into the cylinder and thus the efficiency of the engine. It is found that the air flow through the inlet ports of this known engine, whilst directed, is somewhat diffuse and "unfocussed" and that as a result its momentum is insufficient to carry it with any substantial force in a full loop around the cylinder which means that the cylinder is purged with an effectiveness which is lower than that which is desirable.

It is the object of the invention to provide an engine of the type referred to above in which, in two stroke form, the inlet air produces a more effective purging of exhaust gases remaining from the previous combustion cycle and which, in two stroke or four stroke form, produces a more compact and thus more vigorous stream of inlet air which tumbles and thus creates more intense turbulence at TDC. It is a further object to produce such an engine in which the angle between the inlet and exhaust valve axes, when viewed from the side, may be reduced whereby the compression ratio of the engine is increased.

According to the present invention an engine of the type referred to above is characterised in that the axes of the inlet ducts converge in the direction of flow through them and the axis of each inlet duct defines an angle of at least 20° with that of the other inlet duct or the adjacent inlet duct, when viewed in the direction of the cylinder axis.

It is preferred that the axis of each inlet duct has a substantial axial component, e.g. is inclined by 60°, preferably 45°, or less to a line parallel to the cylinder axis, the line intersecting the axis of the inlet duct. The air flow from the inlet ports is thus generally axially directed but with a temporarily radially outward component as it actually passes around the valve heads of the associated valves, i.e. the air flows preferentially through the ports on the side directed generally towards the adjacent cylinder wall. Thus in the engine in accordance with the present invention the air flow through the inlet ducts is directed generally away from the exhaust valve(s), as in the prior specification referred to above, and is again guided down the adjacent cylinder wall and then flows across the top of the piston and back up the other cylinder wall towards the exhaust valve(s). Little or no air flows out of the inlet ports on the side adjacent the exhaust valve(s) and thus if the engine is a two stroke engine virtually no air flows directly from the inlet ports to the exhaust ports. However, in distinction to the prior specification referred to above, the air which has flowed in through the inlet ports does not move generally parallel to the cylinder axis but instead the flows are convergent and thus coalesce at some point downstream of the inlet ports to form a single, relatively compact stream of air which "tumbles" or flows in a loop within the cylinder in a more vigorous and sustained manner than in the prior specification referred to above.

The angle defined by the axes of the inlet ducts is preferably between 20° and 120°, more preferably 40° and 90° when viewed in the axial direction. In the preferred embodiment in which there are only two inlet ports, the axes of whose ducts lie in a single plane, the axes of these ducts are preferably inclined to one another by between 5° and 15° in that plane. The axes of the inlet ducts preferably intersect at a point 0.75 R to 2 R, preferably R to 1.25 R, away from the cylinder axis, when viewed in plan, R being the radius of the cylinder.

It will be appreciated that in practice the inlet ducts cannot be straight over their entire length since if this were the case the stems of the inlet valves would be accommodated wholly within the inlet ducts. It is therefore necessary that the inlet ducts are bent and references in this specification to "the axes of the inlet ducts" are to be interpreted as references to the direction of the major proportion of the length of the inlet ducts or the predominant direction of the inlet ducts and is in practice an indication of the predominant direction of motion of air within the inlet ducts which is largely unaffected in the short term or over a short distance by a bend in the ducts. In the preferred embodiment each inlet duct is bent shortly upstream of the associated inlet port and has a short portion coaxial with the inlet port downstream of the bend whose axis is inclined at an acute angle to the cylinder axis and a longer portion upstream of the bend whose axis is oppositely inclined at an acute angle to the cylinder axis. The inlet ducts and ports are thus of generally similar construction to those disclosed in the prior patent referred to above but are rotated through a small angle of e.g. 10° to 30° by comparison with the prior specification whereby the angle between the axes of the inlet and exhaust valves is reduced, i.e. the pent-roof is of more flattened shape, which means in turn that the volume of the combustion chamber is reduced also and thus the compression ratio of the engine may be increased. However, this does not result in the potential problem referred to above in connection with GB-A-1568302, namely the obstruction of the air flow through the inlet ports by the adjacent cylinder wall, because the flow direction of the inlet air is somewhat rotated, when viewed in plan, as compared with GB-A-1568302. This results in an increase in the effective length of the flow path between the inlet ports and the adjacent cylinder wall and also in the air flow impinging against the cylinder wall at a very oblique angle.

It is preferred that the inner edge of each bend, when viewed in side elevation, has a relatively sharp radius of curvature which does not exceed 0.3 r, where r is the radius of the associated inlet port. The purpose of this relatively sharp bend is to ensure that the air flowing in the duct breaks away from the wall of the inlet duct at the inside edge of the bend and thus effectively continues to move in a substantially straight line notwithstanding the presence of the bend. It is of course this which is responsible for the "directed" function of the inlet valves in that due to the presence of the bends the air flows out of the inlet ports preferentially or predominantly in one direction only, i.e. the direction parallel to the axes of the inlet ducts, and thus flows out of the inlet ports generally in a direction away from the exhaust port(s).

The single compact "tumbling" air pattern within the cylinder is converted into intense turbulence shortly before TDC and, in the case of a two stroke engine, is found to produce particularly efficient purging of the cylinder and combustion space with very little air flowing directly from the inlet ports to the exhaust ports.

Further features and details of the invention will be apparent from the following description of one multi-cylinder spark ignited two stroke engine in accordance with the invention which is given by way of example with reference to the accompanying diagrammatic drawings, in which.

Figure 1:
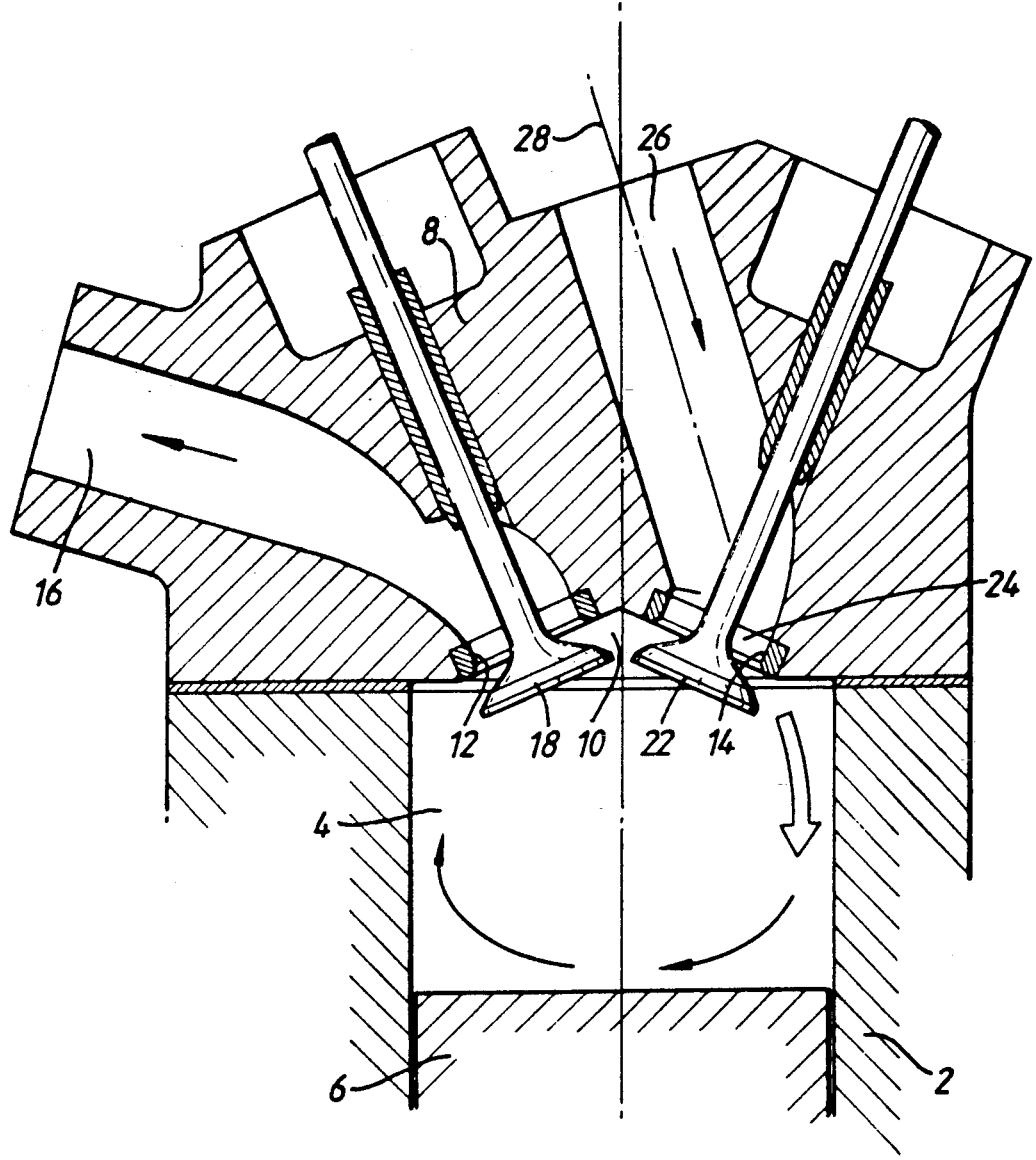
FIG. 1 is a scrap longitudinal section showing the cylinder head and the upper portion of one cylinder of the engine.

The engine comprises a cylinder block 2 defining one or more cylinders 4, in this case four cylinders, each of which contains a reciprocable piston 6. The cylinders 4 are closed by a common cylinder head 8 which has two inclined surfaces above each cylinder, which surfaces are inclined at an angle of 134° and thus define a pent-roof combustion chamber 10. Formed in the two inclined surfaces are two exhaust ports 12 and two inlet ports 14, respectively. The two exhaust ports 12 communicate with one half of the combustion chamber and the two inlet ports 14 communicate with the other half of the combustion chamber, when viewed in plan. The exhaust ports 12 communicate with respective exhaust ducts 16 and are controlled by respective poppet valves 18. Similarly, the inlet ports 14 communicate with respective inlet ducts and are controlled by respective poppet valves 22. The poppet valves 18 and 22 are operated in any conventional manner, e.g. by a cam shaft driven by the engine crankshaft.

Each inlet duct comprises an initial short portion 24 immediately adjacent the associated inlet port 14, whose axis is coincident with that of the inlet port and is inclined to the cylinder axis by 10° to 60°, in this case 23°, and a longer substantially straight portion 26 whose axis 28 is oppositely inclined to the cylinder axis and thus extends towards and then crosses the cylinder axis, when viewed from the side. The intersection of the short and long portions 24 and 26 is such that the inner edge has a relatively small radius of curvature which does not exceed 0.3 r, where r is the radius of the inlet port 14, i.e. the inner radius of the valve seat. The angle of the bend between the short and long portions of the inlet duct is a compromise between the requirements of a directed port, where the angle is desirably relatively large, e.g. 70°, and the requirement that the flow in the duct is substantially parallel to the cylinder axis, where the angle should equal the angle of inclination of the inlet valves, i.e. 23° in this case. The bend angle is typically between 30° and 50°.

When viewed in plan, the axes of the inlet ducts, i.e. the axes 28 of the major portions of the inlet ducts, are convergent in the direction of flow and define an angle of 20° to 120°, preferably 40° to 90°, typically 64°. It is preferred that when viewed in plan the axes 28 converge at a point between 0.75 R and 2 R from the cylinder axis, where R is the radius of the cylinder.

Figure 2:
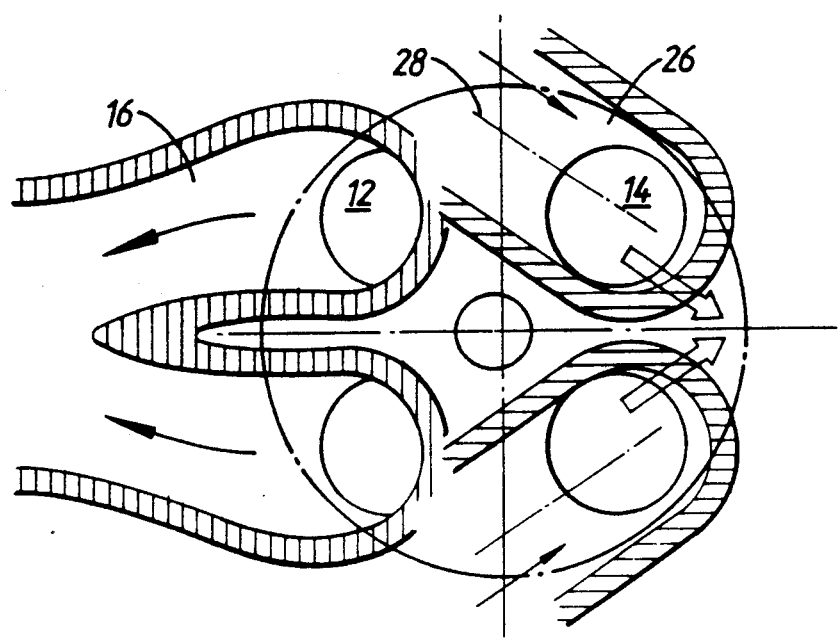
FIG. 2 is a transverse sectional view of the engine of FIG. 1 showing the layout of the engine ports.
Figure 3:
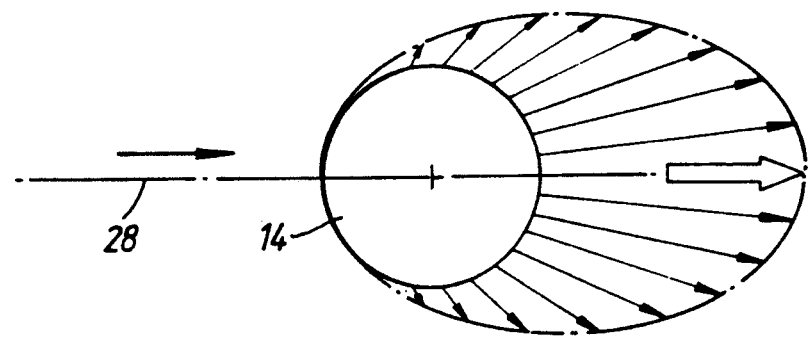
FIG. 3 is a diagram showing the flow rate and directional distribution of air flowing through the inlet ports.

In use, inlet air flows along the inlet ducts in the direction of the axes 28. Due to the sharpness of the intersection of the long and short portions of the inlet ducts, the air flows into the short portions 24 whilst breaking away from the inner edge of the intersection and essentially "sticking" to the outer edge, when viewed in elevation. The air then flows past the heads of the inlet valves 22 and since its momentum is still principally in the direction 28 it flows through the inlet ports only on one side thereof and preferentially or predominantly in a direction parallel to the axis 28, as shown by the large arrows in FIG. 2. As seen in FIG. 3, the air flow through the inlet ports is in fact distributed over a substantial proportion of its angular extent, effectively about one half of its angular extent. The largest proportion of the air flow is parallel to the axis 28 and the proportion flowing in other directions decreases with increasing angular distance from the direction 28. Substantially no air flows out on that side of the inlet valves which is closest to the exhaust valves. The air streams through the two inlet ports are directed downwardly by the adjacent cylinder wall and collide at some point below the cylinder head where they coalesce to form a single, compact, directed air flow which continues down the cylinder wall, across the piston crown and up the piston wall on the other side. The piston crown is preferably flat or only slightly domed, i.e. with a radius of curvature not less than 1.6 R, so as to prevent it destroying the motion of the air. A small dome may help to spread the incoming air over the crown of the piston so that it travels up the opposite wall of the cylinder in a broader column thereby improving the purging of the cylinder. Due to the compact "tumbling" or "loop" motion of the inlet air the cylinder is very effectively purged in the case of a two stroke engine. As the incoming air flows around the cylinder in its tumbling motion it pushes ahead of it the burnt exhaust gases remaining in the cylinder expelling them via the exhaust valves. Tumbling motion also produces very intense turbulence at TDC in the case of both two stroke and four stroke engines.

It will be appreciated that numerous modifications may be effected to the construction described above. For instance, whilst the axes of the inlet and exhaust valves have been shown as equally inclined to the cylinder axis, this is not necessary and the axes of the inlet valves may be closer to the horizontal than the axes of the exhaust valves, i.e. the pent-roof may be steeper on the inlet valve side than the exhaust valve side. In this case, the apex of the pent-roof will no longer be central but displaced towards the inlet valves and may constitute a step or the like which acts as a physical barrier to the direct flow of inlet air from the inlet ports to the exhaust ports. Furthermore, the engine may have three or even more inlet ports and in this case the axis of each inlet duct will be inclined by at least 20° to the axis of all the other inlet ducts or at least the axis of the adjacent or closest inlet duct.

Obviously, numerous modifications and variations of the present invention are possible in the light of the above teachings. It is therefore to be understood that within the scope of the appended claims, the invention may be practices otherwise than as specifically described therein.

What is claimed as new and desired to be secured by Letters Patent of the United States is:

1. An internal combustion engine including at least one cylinder, said cylinder having a wall and an axis, a piston reciprocable within said cylinder and a cylinder head, said cylinder head containing at least one exhaust port, a respective poppet valve controlling said at least one exhaust port, at least two inlet ports, respective further poppet valves controlling said at least two inlet ports and inlet ducts having respective axes and connected to respective inlet ports, said cylinder and said cylinder head defining a combustion chamber with which said inlet and exhaust ports communicate, said inlet ports being of directed type whereby, in use, the flow of air through said inlet ports is generally away from said at least one exhaust port and thus flows down said wall of said cylinder adjacent said inlet ports, said axes of said inlet ducts being convergent in the direction of flow through them and said axis of each said inlet duct defining an angle of at least 20° with that of the adjacent one of the other of said at least two inlet ports, when viewed in the direction of said cylinder axis.

2. An engine as claimed in claim 1 wherein the angle defined by said axes of said inlet ducts is between 20° and 120°.

3. An engine as claimed in claim 2 wherein the angle defined by said axes of said inlet ducts is between 40° and 90°.

4. An engine as claimed in claim 1 wherein said axes of said inlet ducts intersect at a point 0.75 R to 2 R away from said cylinder axis, when viewed in the direction of said cylinder axis, R being the radius of said cylinder.

5. An engine as claimed in claim 1 wherein each said inlet duct is bent shortly upstream of the associated inlet port and includes a short portion coaxial with said associated inlet port downstream of the bend and a longer portion upstream of said bend, said long and short portions having respective axes which are oppositely inclined at acute angles to said cylinder axis.

6. An engine as claimed in claim 5 wherein said axes of said short and longer portions of said inlet ducts are inclined to one another by between 30° and 90°.

7. An engine as claimed in claim 1 wherein each poppet valve controlling one of said inlet ports includes an elongate stem, said stem being inclined to said cylinder axis by between 10° and 60°.

* * * * *